Nov. 8, 1960  D. M. FIGERT ET AL  2,959,289
FILTER AND DEHYDRATOR

Filed April 4, 1956  4 Sheets-Sheet 1

INVENTORS.
DONALD M. FIGERT
MICHAEL G. GRANT
WILLARD EICHELBERGER
BY

*Albert L. Jeffers*
ATTORNEY

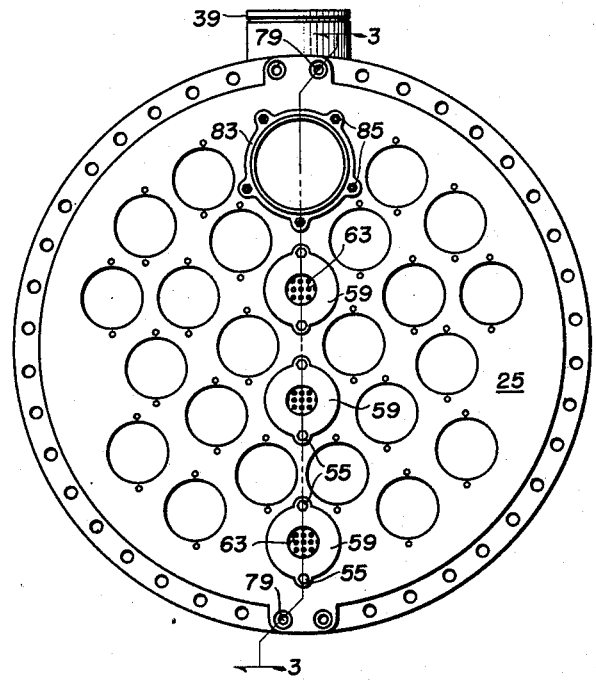
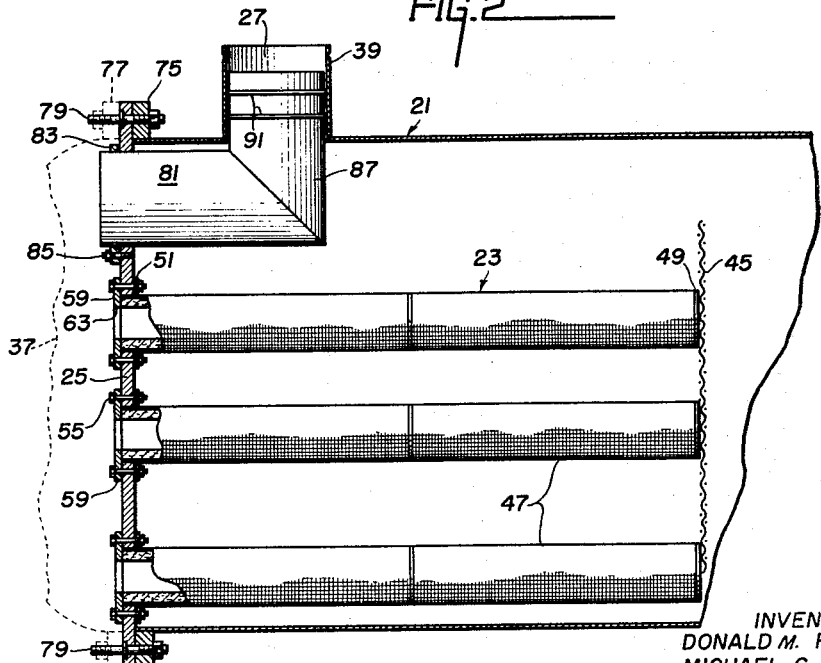

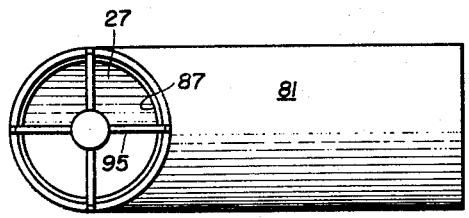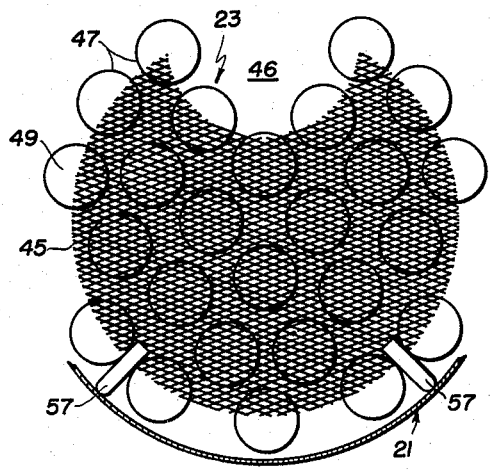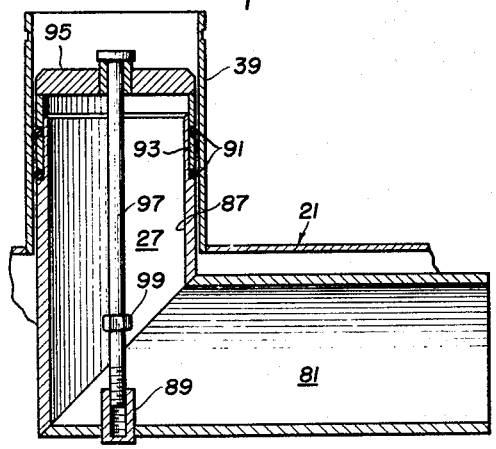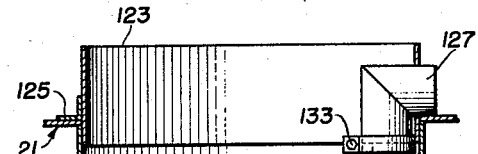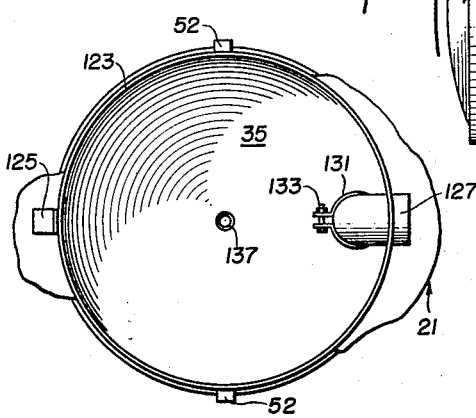

Nov. 8, 1960 D. M. FIGERT ET AL 2,959,289
FILTER AND DEHYDRATOR
Filed April 4, 1956 4 Sheets-Sheet 4
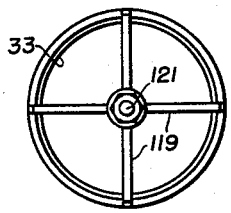
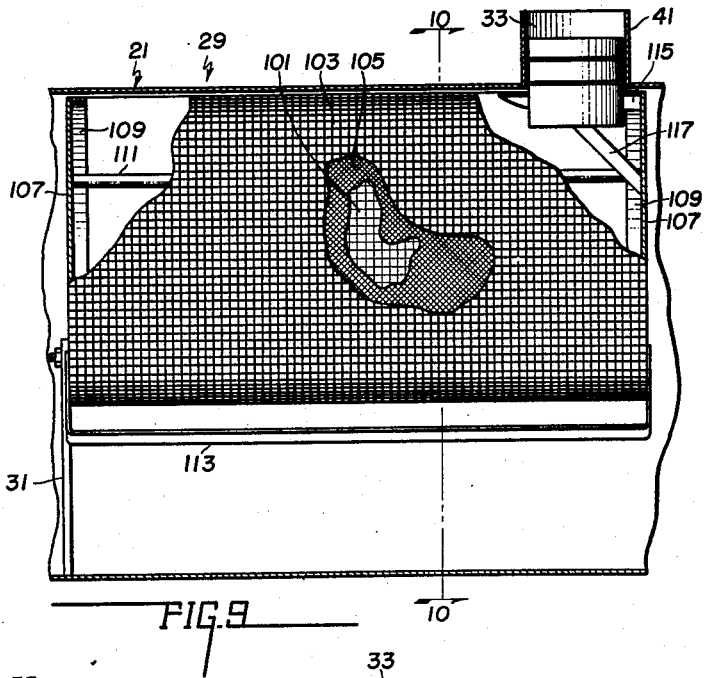
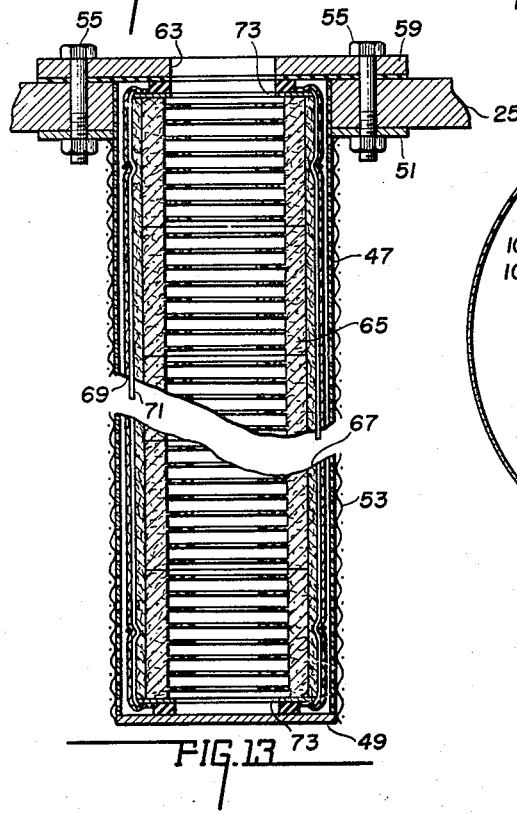
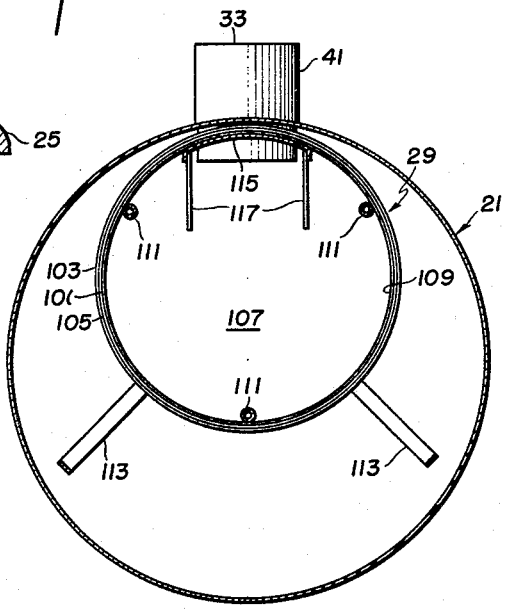
INVENTORS.
DONALD M. FIGERT
MICHAEL G. GRANT
WILLARD EICHELBERGER
BY
Albert L. Jeffers
ATTORNEY

United States Patent Office 2,959,289
Patented Nov. 8, 1960

2,959,289
FILTER AND DEHYDRATOR

Donald M. Figert, Washington, D.C., and Michael G. Grant and Willard Eichelberger, Baltimore, Md., assignors to The Briggs Filtration Co., Washington, D.C., a corporation of Maryland Filed Apr. 4, 1956, Ser. No. 576,097

8 Claims. (Cl. 210—307)

The invention relates generally to means for conditioning a liquid and more particularly is directed to apparatus embodying improved principles of design and construction which serves to remove substantially all foreign matter, including water, from liquids, such as light fuels, solvents, distillates and light petroleum liquids.

The apparatus is particularly designed and constructed for use in purifying fuels used in aircraft engines where efficient operation is of the utmost importance. The invention has proven exceptionally advantageous in filtering and dehydrating such fuels so as to positively assure freedom from engine failure or erratic operation, incomplete combustion, corrosion and undue accumulation of carbon deposits frequently due to sludge and water.

With the foregoing in mind, one of the principal objects of the invention is to provide an apparatus or system comprising, among other things, an elongated tank with a plurality of sub-assemblies or units disposed therein, or associated therewith, which successively condition or treat a liquid circulating or passing through the tank. More particularly in this respect, the apparatus includes a filter unit or structure detachably supported at one extremity of the tank, a screen unit detachably mounted adjacent the other extremity of the tank, and a sump disposed below the screen unit whereby the impurities removed from the liquids can be drained away or removed from the tank in any manner desired. The filter and screen units are utilized to successively condition or purify the liquid.

An important object of the invention is to provide an improved filter and/or dehydrator unit which, among other things, serves to close off one end of the tank and is detachably connected thereto.

A significant object of the invention is to provide a filter unit, with filter cartridges, embodying improved principles of design and construction, which are mounted on a support in the form of a head member or deck plate in a unique way so that the cartridges can be readily installed and then later removed when they become clogged and are no longer usable.

A specific object of the invention is to provide a cartridge which preferably includes a primary filter of tubular cylindrical shape constructed of fibrous elements and a secondary filter of fibrous elements surrounding the primary filter. The fibrous elements are preferably in the form of a material known in the trade as fiber-glass which has the inherent phenomena that a relatively light liquid petroleum fuel has a profound affinity therefor. In other words, fuel of this kind will pass or flow through such material at a much faster rate than water.

The primary filter of the cartridge performs the double function of coalescing minute particles of entrained water into larger particles or droplets and in removing these along with any foreign solid matter of micronic size from the liquid.

The densities of the primary and secondary filter of each cartridge may be varied, and as disclosed herein, the primary filter is preferably made of a greater density than the secondary filter. The secondary filter also functions to coalesce any water and remove it along with any solid foreign matter which may have escaped entire removal by the primary filter. With such an arrangement, the filters complement one another to provide a positive and efficient filtering of the liquid. The secondary filter also offers the advantage that it prevents the passage of any fibers loosened from the primary filter from passing through the secondary filter and into the liquid and thereby insures the production of an ultra-clean liquid.

The cartridge also preferably includes a cover, preferably in the form of a woven fabric to provide a third filter to further promote coalescence of water and remove it along with any foreign matter passing through the secondary filter.

A particular object of the invention is to provide means, preferably in the form of a relatively rigid tubular foraminated member, about each cartridge to impart stability therto. Straining means, preferably in the form of a screen cylinder or sleeve is mounted on each of the foraminated members to assist in separating the coalesced water from the liquid fuel. Provision is made for supporting the tubular members and the screen sleeves therein between the head member or support, above referred to, and a supplemental support spaced therefrom.

Another important object of the invention is to provide an inlet conduit or fitting which is attached to the filter unit and detachably connected to the tank in a unique manner to establish a fluid tight joint therebetween.

A significant object of the invention is to provide a screen subassembly or unit which is preferably longitudinally spaced from the filter unit and is detachably supported in the tank in a novel way to locate the unit above the bottom of the tank and the sump. The screen unit may be designed and constructed as desired, and as exemplified herein, includes a plurality of tubular screen members of different sized meshes through which the liquid passes after leaving the filter unit to further promote coalescing of any entrained water which subsequently falls or flows downwardly therefrom to the bottom of the tank for entry into the sump in more or less the same manner as droplets of water extracted from the filter unit.

A specific object of the invention is to provide the screen unit with a framework for the screen members and with runners which assist in piloting the unit into the tank and supporting it above the sump.

An additional object of the invention is to provide a novel sump structure embodying improved principles of design and construction, including means for automatically discharging the foreign matter and water therefrom, and a baffle or weir associated with the sump which assists in preventing fuel from entering the sump.

Many other objects and advantages of the invention will become apparent after the description hereinafter set forth is considered in conjunction with the drawings annexed hereto.

In the drawings:

Figure 2 is an elevational end view of the apparatus, the frame supporting the apparatus being omitted;

Figure 3 is a vertical section taken substantially on line 3—3 of Figure 2 showing an enlarged horizontal partial view of the apparatus, with portions broken away to illustrate the structure of the filter unit or sub-assembly;

Figure 4 is a vertical section taken substantially on line 4—4 of Figure 1 showing the character of the supplemental support for the tubular foraminated members of the filter unit;

Figure 5 is a top view of the fuel inlet conduit or fitting which is adapted to be fastened to the filter unit and tank;

Figure 6 is a vertical sectional view showing the fuel inlet conduit as supported on the tank;

Figure 7 is an elevational side view of the sump with portions broken away to illustrate details thereof;

Figure 8 is a top view of the sump shown in Figure 7;

Figure 9 is an elevational side view of the screen unit with portions of the tank broken away to show certain structure;

Figure 10 is a transverse section taken substantially on line 10—10 of Figure 9, depicting the character of the screen unit including the framework and runners therefor above referred to;

Figure 11 is a top view of a tubular conduit or fitting constituting a fuel outlet and which is employed to assist in supporting the screen unit in the tank;

Figure 12 is a vertical section taken through the fuel outlet conduit showing its construction and connection with the tank; and Figure 13 is an enlarged partial sectional view of a cartridge and mode of supporting it.

Figure 1:
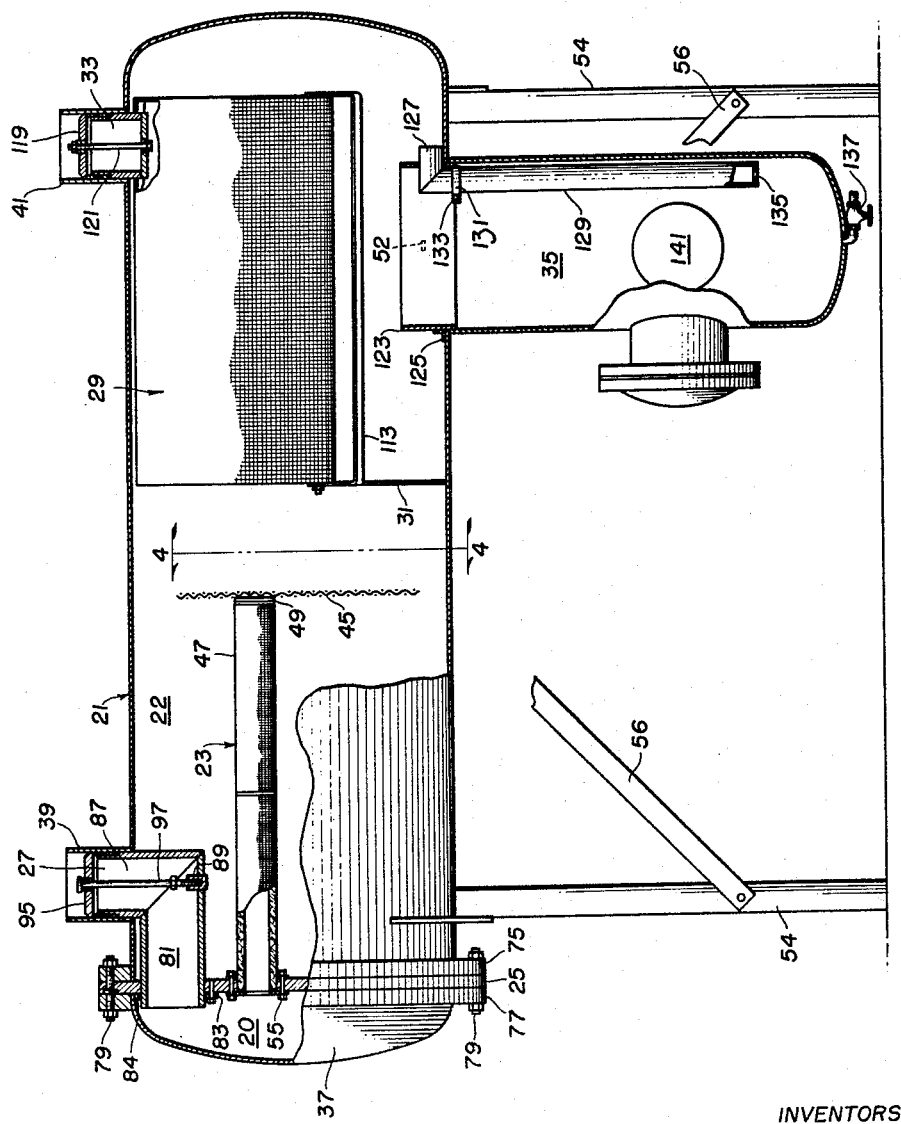
Figure 1 is an elevational side view of the apparatus embodying the invention, with portions broken away to exemplify structural details.

Referring to the apparatus exemplified in Figure 1 of the drawing, the numeral 21 generally designates an elongated horizontal cylindrical tank, suitably supported on legs; 23 a filter unit or sub-assembly mounted in the left end of the tank by a front round support or deck plate 25; 27 a fuel inlet conduit; 29 a screen unit or sub-assembly mounted in the other end of the tank by an adjustable support or prop 31 and fuel outlet conduit 33; and a sump 35 supported in a depending position on the tank below the screen unit for receiving solid foreign matter and/or water extracted from the filter and screen units as the liquid flows or circulates successively through these units from the tank inlet to the outlet.

The sub-assemblies will be described generally in the order in which they have been above alluded to.

The tank designated 21, which may be constructed as desired, includes a cover 37 and is preferably provided with a vertical tubular fitting 39 welded to the upper part of the tank adjacent the front end of the apparatus for detachably receiving the conduit inlet 27 of the filter unit. The tank is also provided with another vertical tubular fitting 41 similarly secured to the upper part of the tank adjacent its rear end for receiving the conduit outlet of the screen unit, all of which will be described more in detail subsequently.

The filter unit may be designed and constructed in various ways but as herein disclosed it is adapted for detachable connection with the tank in a unique manner and so that it can be readily removed to replenish same with new cartridges when required. More particularly in this regard, the filter unit includes, among other things, the round front support 25; a rear support 45, a plurality of cylindrical foraminated tubes 47 having their ends respectively secured to the supports to maintain the tubes in a predetermined parallel relationship; and the tubular inlet conduit 27 above referred to.

More specifically in this regard, the rear end of each tube of the tubes 47 is preferably closed and reinforced by a relatively thick disc 49 secured in place by welding. An annular flange 51 is preferably secured to each tube by a ring weld or welds so that the front open end of each tube extends forwardly of the flange a distance substantially equal to the thickness of the front support 25 to place the end flush or slightly inset from the outer planar surface of the front support.

A screen sleeve or cylinder 53 is mounted on each of the tubes and its ends are preferably welded to the disc 49 and flange 51 and/or the ends of a tube for the purpose of promoting the separation of the coalesced water from the liquid fuel after the latter passes through the filter cartridges. The flange 51 is provided with apertured ears through which threaded fasteners 55 extend.

The rear ends of the tubes are preferably anchored to the rear support 45 by welding the discs 49 thereto. A pair of angularly disposed legs 57, as shown in Figure 4, are preferably welded to the rear surface of the support 45 for supporting and positioning the rear extremity of the filter unit. The rear support 45 is preferably perforated and with an upper portion thereof cut away so as to provide clearance when the filter assembly or unit 23 is being assembled with the tank and at the same time afford a freer flow of the liquid in the direction of the screen unit 29.

The head or front support 25 of the filter unit constitutes a partition dividing the tank into an entrance chamber and a circulating chamber. The support is provided with a plurality of corresponding round openings which respectively receive the fore ends of the tubes 47. The tubes are preferably detachably secured in place by the annular flanges 51 which abut the rear surface of the front support, locking means preferably in the form of front plates 59 and the threaded fasteners 55. Each of the front plates, as shown in Figures 2 and 3, is provided with an opening 63 of a diameter slightly less than the inside diameter of a tube so that the liquid will flow rearwardly into a cartridge without interruption. The plates and flanges are provided with apertured ears and the fasteners 55 extend therethrough and through holes therefor in the support so that nuts on the fastener can be tightened to firmly secure each tube and screen cylinder, constituting a unit, to the support as depicted in Figures 1, 2, 3, and 13. A gasket for sealing purposes is preferably interposed between each of the front plates and the support.

One or more cartridges are disposed in each of the tubes as shown in Figure 1. Each cartridge may be constructed as desired but as illustrated in Figure 13, each is preferably comprised of a plurality of members 65 having openings therein to form a longitudinal passage. Each member is preferably constructed of a desirable fibrous material or elements, such as fiber glass, which is treated with a binding agent, such as a phenol formaldehyde thermosetting resin. These members 65 constitute a primary filter of a predetermined density and a secondary filter 67 of similar material and preferably of a lesser density, is disposed about the primary filter. The secondary filter is also preferably made in the form of a sheet which is wrapped about the primary filter. A third filter 69, preferably in the form of a cotton fabric sleeve, surrounds the secondary filter. The members 65 are preferably secured together, in superimposed relationship, to constitute a unit, by flexible connection means 71 which connect with plates 73 at the ends of the unit. The ends of the secondary filter and sleeve are preferably cemented to the end plates and if found desirable, bands may be placed about the sleeve to additionally secure the components together as shown. Gaskets are secured to the ends of each unit for sealing the ends of the unit against the discs 49 and plates 59.

The three filters of each cartridge serve to successively filter the liquid fuel so that water will coalesce on the exterior of the cartridges, and the screen sleeves 53 serve to substantially prevent the coalesced water from flowing over to the screen unit 29 and out through the outlet conduit 33. The coalesced water finds its way to the bottom of the tank and eventually into the sump 35. The screen sleeves act as straining means and the third filters to some extent may serve the same purpose as the sleeves. The liquid after passing through the cartridges may freely circulate thereabout and lengthwise of the cartridges due to the spacing between the foraminated tubes 47 and the fact that the cross dimension of the filter unit is somewhat less than the diameter of the tank. The cartridges and straining means thus insure a complete filtering of the liquid fuel. When the cartridges become clogged they may be readily replaced with new ones by merely removing the cover of the tank and the plates 59.

The filter unit 23 may be mounted in the circulating chamber of the tank in various ways, but as shown this is accomplished in part by respectively providing the front end of the tank and its cover with relatively thick annular surrounding flanges 75 and 77 and the front support 25, with diametrically disposed apertured ears. The diameters of the flanges are substantially the same and each flange is provided with a ring of holes. Threaded fasteners 79 extend through the holes and the apertures and nuts on the fasteners serve to detachably secure the support 25, in a firm position between the flanges 75 and 77, as illustrated in Figures 1 and 3. Gaskets are provided where required. The connection of the fasteners with the cover, support and tank is such, that if found desirable, the cover and support can be detached as a unit from the tank or the cover can be detached while the support and tank remains connected, or from the support after the latter is detached therewith from the tank.

As alluded to above, the conduit inlet 27 for the liquid is operatively connected to the support 25 and tank in a unique manner and this will now be described. The conduit is preferably affixed to the fitting 39 on the tank before the filter unit is installed. The conduit, as illustrated in Figures 1, 3, 5 and 6, is preferably in the form of an elbow having a tubular horizontal portion 81 which extends forwardly through an opening or port therefor in the support. An annular ring or flange 83 is mounted on the tubular portion 81. This flange is preferably provided with a bevel and a gasket 84 bears against this bevel and the front side of the support 25. Screws 85 extend through the flange and into the support as shown in Figures 1, 2, 3 and 13 to compress the gasket and thereby seal the connection between the conduit and support and at the same time provide a relatively firm resilient support for the conduit. It will be noted that the conduit extends into the circulating chamber of the tank and communicates with the entrance chamber through the opening or port in the partition or support 25.

The inlet conduit 27 also includes a vertical portion 87 which extends upwardly into telescoping relation with the vertical tubular fitting 39 on the tank. The horizontal and vertical portions of the elbow are preferably joined together by a miter-weld. A threaded member 89, as depicted in Figures 1 and 6, is secured against rotation to the horizontal portion 81 of the conduit or elbow and the vertical portion is provided with a reduced extremity having annular gaskets 91 thereon with a ring 93 between the gaskets, and a clamping spider member 95, having a rim with an axial flange thereon, is arranged in the vertical fitting 39. This spider member is carried by the conduit and has a central portion provided with an aperture and a threaded shaft 97 extends through the aperture and has its lower end connected to the threaded member 89. The shaft is preferably provided with a squared portion 99 which can be engaged by a tool to tighten or loosen the shaft. When the shaft is tightened the axial flange on the spider member will engage the upper gasket and effect an expansion thereof, and the lower gasket will be expanded by the ring 93 to provide a dual seal between the vertical tubular portion 87 of the elbow and the vertical fitting 39 on the tank. The squared portion 99 of the shaft is accessible from the front through the horizontal portion of the elbow before the cover 37 of the tank is secured in place. Any means suitable for the purpose may be provided for operatively connecting the vertical fitting 39 on the tank with a source of liquid adapted for passage into the apparatus or system through the inlet provided by the conduit 27.

Attention is directed to the fact that the arrangement is such that the vertical portion 87 of the conduit elbow can be readily moved upwardly into the vertical fitting 39 before the filter unit is adjusted and mounted in the tank. Since the clamping member, shaft, ring and gaskets are affixed to the conduit prior to installing the filter unit, they are readily accessible for actuation or use after the conduit is moved upwardly into the vertical fitting 39 on the tank. After the fuel inlet conduit 27 is installed in the fitting 39, the filter unit is mounted in the tank so that the horizontal portion of the conduit will be received in the opening or port provided therefor in the support 25. The flange 83 and gasket 84 are then placed on the conduit and the screws 85 applied. The conduit can also be readily adjusted with respect to the tank and support after the filter unit is installed. It is thus evident that the extremities of the conduit 27 are detachably and resiliently mounted on the tank and filter unit. As mentioned above, an upper portion of the rear support 45 of the filter unit is preferably removed to provide clearance when assembling the filter unit with the tank. The rear extremity of the filter unit is primarily supported in the tank by the legs 57 carried by the rear support. These legs also assist in piloting the filter unit into the tank.

It will be noted that the cover 37 of the tank is dished considerably so that it and the support 25 form an entrance chamber constituting a manifold which receives the liquid from the conduit inlet for circulation into the cartridges of the filter unit or assembly 23.

The screen unit or assembly 29, which will now be described, may be designed and constructed in various ways but as disclosed in Figures 1, and 9 through 12 it is preferably comprised of three relatively large screen cylinders 101, 103 and 105 secured together with one between the confines of the others. The inner and outer cylinders 101, and 103 are preferably of a slightly larger mesh, such as 12 per inch, while the intermediate cylinder 105 is of a much smaller mesh, such as 100 per inch. The intermediate cylinder 105 is preferably made of Monel metal and the others of conventional screen cloth.

The screen cylinders, preferably in engagement, are mounted on a suitable frame which, among other things, includes a pair of round and flat end plates 107 having ring members 109 respectively butt welded thereto and three longitudinally extending rods 111 having their ends respectively welded or otherwise secured to the end plates to stabilize and support the screen cylinders and prevent collapse thereof. The ends of the screen cylinders are also supported on the ring members and may be welded or otherwise secured thereto. The screen unit is provided with a pair of runners 113 having upturned ends which are secured to the end plates 107. The purpose of these runners will be described subsequently.

As shown in Figures 9 and 10 a shelf or platform 115 is welded to the rear end plate 107 and ring member 109 and a pair of diagonal braces 117, disposed in parallel relation, have their ends welded to the shelf and to the rear end plate 107 and ring member 109. The fuel outlet conduit 33 is welded in an opening provided therefor in the shelf with its lower end depending into the frame between the braces 117 and its upper end above the frame. Clamping spider members 119 are held at the ends of the conduit by a bolt 121 connecting the members. The conduit is provided with an upper reduced extremity having annular gaskets and a ring thereon like those on the inlet conduit 27, so that when the upper end of the outlet conduit is inserted upwardly into telescoping relation with the vertical tubular fitting 41 on the tank and the nut on the bolt is tightened the gaskets will be caused to expand and engage the inner surface of the fitting to provide a double seal to prevent the escape of liquid between the tubular fitting and conduit in substantially the same manner that the inlet conduit is sealed and connected to the tank. Any suitable connection can be made between the fitting 41 and the location where the purified liquid is to be delivered.

The screen unit 29, as alluded to above, is provided with a pair of runners 113 and the adjustable prop 31. The runners assist in sliding the unit into the rear extremity of tank and also prevent it from engaging an arcuate baffle 123 adjacent the sump 35. After the unit is moved to the appropriate position it is raised, preferably by grasping and pulling up on the upper clamping member 119 so that the outlet conduit is received in the fitting 41, after which the nut on the bolt 121 is tightened to provide a dual seal and also resiliently support the rear extremity of the screen or straining unit with respect to the tank. The prop 31 is, of course, adjusted to support the front extremity of the unit. The unit can be readily levelled by adjusting the prop and/or the connection between the unit and tank. It will be noted that the runners serve no purpose other than to assist in facilitating assembly of the screen unit with the tank.

The screen unit 29 is disposed in longitudinal spaced relation to the filter unit 23 and receives the liquid therefrom for additional straining or filtering before it flows out through the outlet provided by the conduit 33. The screen cylinders, and particularly the one made from Monel metal, serve to coalesce any water which may have escaped from the filter unit and has not circulated into the bottom of the tank. The water droplets forming on the exterior surfaces of the screens accumulate and then circulate or gravitate to the bottom of the tank and some fall directly into the sump 35 disposed some distance below the screen unit. Since the ends of the screen unit are closed the liquid will be caused to more or less flow in a uniform pattern around the front end plate 107 and then generally radially into the unit so that the liquid will pass through larger areas of the screens. The liquid may also freely circulate about the screen unit due to its spaced relationship to the tank and its end relationship to the rear end wall of the tank which is dome-like in shape.

The sump designated 35, clearly shown in Figures 1, 7 and 8, embodies improved principles of design and construction and will now be described. The sump is preferably made in the form of a relatively large depending cylinder having a bottom wall and an upper open end portion which is preferably welded to the tank in registry with an outlet opening provided in the bottom of the tank 21. The tubular baffle 123 is disposed in the opening of the tank and extends into the sump. The baffle is provided with a flange 125 which bears against the bottom of the tank and also with an opening which receives an offset horizontal portion 127 of an elephant or drain tube. This tube also has a depending or vertical portion 129 which terminates short of the bottom wall of the sump as depicted in Figures 1 and 7. A split clamping ring 131 and a bolt 133 carried by the ring secures the ring about the depending portion of the drain tube to secure the tube in place with its offset 127 which extends through the opening in the baffle. Obviously, any other suitable means may be provided for supporting the drain tube.

The lower end of the drain tube is preferably provided with a wall having an aperture 135 therein through which any foreign matter and/or water received from the tank through the offset portion 127 may drain into the sump. The bottom wall of the sump and the side wall thereof are respectively provided with a manually controlled valved outlet 137 and a valved outlet controlled by a float (not shown) is located above the valved outlet 137 and the aperture 135 in the drain tube. The manually controlled valve outlet permits release of any foreign matter or water accumulating in the bottom of the sump, whereas the float controlled valve serves to automatically release water through an outlet not shown whenever the water in the sump reaches a predetermined level.

It will be noted that the sump is of a relatively large capacity and is preferably located directly below the screen unit so that some of the water droplets extracted by the screen or straining unit will fall or make their way directly into the sump without entering through the drain tube. It will also be noted that sufficient space is provided between the screen unit and sump to permit the liquid to circulate for passage into the screen unit while permitting the water droplets to seek a lower level where they can enter the sump through its open end and/or through the drain tube.

The shape and size of the baffle 123 and its relationship to the tank, the filter and screen units and sump is predetermined so as to prevent, within practical limits, the fuel flowing directly into the sump or thereinto by way of the drain tube. More particularly in this regard, the baffle serves to prevent formation of an emulsion in the sump. Without the baffle and drain tube setup, it was discovered that water would cascade into the sump with sufficient force to slowly form an emulsion on the interface of the normal water leg in the sump and as the emulsion became deeper and was finally low enough to the float controlled valved outlet, a vortex was pulled off the bottom of the emulsion every time this outlet was opened. By constructing and locating the baffle or weir at the top of the sump and by providing a drain tube which is located as shown, the water accumulating in the tank will flow down into the water phase and thereby prevent formation of an emulsion on the interface and discharge of any appreciable amount of fuel along with the water through the float controlled outlet.

In view of the foregoing, it will be manifest that improved means have been utilized to filter a liquid, such as a liquid fuel, a multiplicity of times in different or various ways to remove substantially all solid foreign matter and/or water therefrom to condition it for the use intended.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

We claim:

1. A filter assembly of the kind described comprising a front support and a rear support, said front support being provided with an opening, a foraminated tube having its rear end connected to the rear support and its fore end disposed in the opening, a stop carried by the tube engaging one side of the front support, a member at the other side of the front support, means extending through the front support and connecting the stop and member for holding the tube and member attached to the front support, said member also serving to detachably retain a filter cartridge in the tube, and said member being provided with an aperture affording access to the interior of the tube.

2. In combination: a tank provided with a lower opening and an upper opening, a sump secured in a depending position to the tank and communicating with its interior by means of said lower opening, a baffle disposed in the tank and disposed around the lower opening, a tube communicatively connected with the interior of the tank and sump by a portion extending through the baffle into the tank and a portion extending downwardly into the lower portion of the sump, and a screen unit secured across the upper opening and above the lower opening.

3. A subassembly of the kind described comprising a casing forming a sump having an upper open end, a baffle disposed around the open end and provided with an opening, and a drain tube having a portion communicating with the opening and a portion extending downwardly into communication with the lower portion of the sump.

4. In combination: a horizontal tank, means at one extremity for filtering a fluid entering the tank, upper and lower outlets at the other extremity of the tank, straining means interposed between the outlets, said tank having a depending formation provided with an opening communicating with the lower outlet and disposed directly below the straining means, a baffle disposed around the lower outlet and provided with an aperture, and a drain tube communicating with the aperture and extending downwardly into the formation.

5. A screen assembly comprising a pair of end plates, a plurality of parallel tie members joining the plates to maintain the plates in a spaced relationship, a shelf connected to one of the end plates and provided with an opening for receiving a conduit, a tubular straining element pervious to oil and impervious to water, said straining element substantially surrounding the tie members and substantially closing the space between the plates so that any oil flowing through the straining element and into the space may be caused to pass out the opening.

6. An assembly comprising a frame having a pair of end members secured together in spaced relationship, a plurality of tubular screens mounted on the frame and substantially closing the space between the members, said screens pervious to oil and impervious to water, a conduit carried by the frame, said conduit communicating with the space and providing means assisting to attach the assembly with respect to a mounting, means carried by the assembly assisting to guide the assembly into a tank, and an adjustable prop carried by the assembly.

7. A subassembly of the kind described, comprising an elongated perforated tube closed at one end and having a fitting at its other end for attaching the assembly to a support, a screen surrounding the tube, a filter structure disposed in the tube, said structure comprising a first tubular mass of fiber glass filter material of a predetermined density, a second mass of fiber glass filter material surrounding the first mass and having a less density than the first mass, and a third mass of filter material surrounding the second mass and having a less density than the second mass so as to progressively filter a fluid adapted for passage therethrough.

8. A water-fuel separator comprising a tank having a fuel inlet and a fuel outlet, said tank having a depending formation adjacent one end provided with an opening communicating with the tank, the improvement comprising, in combination, a partition for dividing the tank into an inlet chamber and an outlet chamber, said partition provided with an opening and a port, a first tubular member telescopically connected to the fuel inlet and to the opening in the partition, a water and fuel separating cartridge disposed in the outlet chamber and supported by the partition so that the cartridge communicates with said port, said cartridge comprising a tubular mass of fiber glass material of a predetermined density for coalescing particles of water in the fuel into drops when a mixture of fuel and water passes therethrough, a straining unit pervious to fuel and impervious to water disposed in the outlet chamber adjacent the fuel outlet, a second tubular member telescopically connected to the fuel outlet and to the straining unit so that the fuel will flow through the fuel outlet and the water will flow toward the depending formation, a baffle disposed around the opening in the depending formation and provided with an aperture, and a drain tube communicating with the aperture and extending downwardly into the lower part of the formation.

References Cited in the file of this patent

UNITED STATES PATENTS

| | | |
|---|---|---|
| 807,547 | Fliegel | Dec. 19, 1905 |
| 995,402 | Davis | June 13, 1911 |
| 1,284,587 | Bylander | Nov. 12, 1918 |
| 1,307,677 | Konkle | June 24, 1919 |
| 1,518,686 | Bland | Dec. 9, 1924 |
| 1,548,400 | Walker | Aug. 4, 1925 |
| 2,107,406 | Wood | Feb. 8, 1938 |
| 2,349,469 | Sloan | May 23, 1944 |
| 2,468,382 | Taylor | Apr. 26, 1949 |
| 2,490,443 | Knipper | Dec. 6, 1949 |
| 2,597,475 | Grise | May 20, 1952 |
| 2,625,268 | Hatfield | Jan. 13, 1953 |
| 2,625,273 | Schuller | Jan. 13, 1953 |
| 2,626,709 | Krieble | Jan. 27, 1953 |
| 2,723,757 | Brunton | Nov. 15, 1955 |
| 2,725,986 | Marvel | Dec. 6, 1955 |
| 2,731,150 | McCann | Jan. 17, 1956 |
| 2,883,345 | Taylor et al. | Apr. 21, 1959 |